Patented July 6, 1937

2,086,139

UNITED STATES PATENT OFFICE 2,086,139

METHOD FOR THE PRODUCTION OF HYDROGENATION PRODUCTS OF THE FOLLICLE HORMONES

Walter Schoeller, Berlin-Westend, Germany, Erwin Schwenk, New York, N. Y., and Friedrich Hildebrandt, Hohen Neuendorf, near Berlin, Germany, assignors to Schering-Kahlbaum A. G., Berlin, Germany, a corporation of Germany No Drawing. Application April 12, 1934, Serial No. 720,322. In Germany April 13, 1933

17 Claims. (Cl. 260—153)

This invention refers to follicle hormones and more particularly to hydrogenation products of the follicle hormones and a method of making the same.

It has been found that solutions of the follicle hormone of the formula $C_{18}H_{22}O_2$ or the like in various solvents can be hydrogenated by means of hydrogen under pressure in the presence of suitable hydrogenation catalysts whereby products are obtained which still contain all the oxygen atoms of the starting material. Thus, on the one hand products are obtained, having the general formula $C_{18}H_{28}O_2$, wherein the benzene nucleus present in the molecule of the follicle hormone is hydrogenated while the keto group remains intact. On the other hand also such products may be produced wherein the benzene group as well as the keto group are hydrogenated, the latter to the corresponding secondary alcohol group, said products having the general formula $C_{18}H_{30}O_2$. Such catalytic methods as are described in the book by Houben entitled "Methoden der Organischen Chemie", 3rd edition, vol. II, page 325 et seq., particularly pages 328 and 329, are easily adaptable to the process of the present invention.

Suitable solvents for this purpose are, for instance, hydrocarbons or hydroaromatic alcohols, such as cyclohexanol, or also dilute alkali solutions and the like. As catalysts may be used the known hydrogenation catalysts, as for instance, the nickel-copper catalyst obtained by precipitating a mixture of nickel nitrate and copper nitrate by means of alkalies with subsequent reduction of the dried oxides by means of hydrogen. Not only the chemically pure hormone of the formula $C_{18}H_{22}O_2$ may be used as starting material but also the various crude crystalline products as obtained by other separation processes wherein besides the above mentioned hormone also other isomers or the like substances are present.

The following examples serve to illustrate the invention without, however, limiting the same to them.

*Example 1*

1 gram of the pure follicle hormone of the formula $C_{18}H_{22}O_2$ is dissolved in 200 cc. of a 10% solution of potassium hydroxide. To this solution the same amount of a previously reduced nickel-copper catalyst is added whereupon the mixture is heated in an autoclave in the presence of hydrogen at a pressure of 100 atmospheres and a temperature of 160° C. When no more hydrogen is absorbed, the alkaline solution is extracted with ether, the catalyst is removed by filtration and the ethereal solution is evaporated to dryness.

A glass-like, colorless residue remains, the analysis of which yields values corresponding to a compound of the general formula $C_{18}H_{30}O_2$. By distillation in a high vacuum several crystalline fractions are obtained. The glass-like hydrogenation product as well as the separate fractions exhibit a considerable efficiency in the capon comb test.

The alkaline mother liquors remaining after the extraction with ether yield on acidifying the dihydrofollicle hormone of the general formula $C_{18}H_{24}O_2$.

Likewise, instead of the pure follicle hormone $C_{18}H_{22}O_2$, also the crude crystallization products may be used which contain in addition to the known α-follicle hormone also the related hormones of the same formula as well as the less saturated hormones of the formula $C_{18}H_{20}O_2$ and $C_{18}H_{18}O_2$ and the like. In the latter case, however, the consumption of hydrogen is correspondingly larger.

*Example 2*

3 grams of the crystalline follicle hormone are dissolved in cyclohexanol and the solution is treated with hydrogen in the presence of the same amount of a previously reduced nickel catalyst in an autoclave at 170° C. and a pressure of 60 to 70 atmospheres. When no more hydrogen is absorbed the solution is filtered, the cyclohexanol is removed by vacuum distillation, the residue is taken up in ether, whereupon the ethereal solution is extracted with aqueous alkali solution in order to remove traces of unchanged starting material. The ethereal solution yields on evaporation to dryness a product which corresponds to that obtained according to Example 1 and has the general formula $C_{18}H_{30}O_2$. This product exhibits also a considerable efficiency in the capon comb test.

Various changes may be made in the details disclosed in the foregoing specification without departing from the invention and from the principles set forth herein and in the claims annexed hereto.

What we claim, is:

1. A method for the production of hydrogenation products of follicle hormones which comprises subjecting solutions of follicle hormones taken from the class consisting of $C_{18}H_{18}O_2$, $C_{18}H_{20}O_2$ and $C_{18}H_{22}O_2$, to the action of hydrogen under superatmospheric pressure in the presence of hydrogenation catalysts which are capable of causing hydrogenation of the benzene ring but incapable of causing removal of oxygen to form a compound of the following structural formula:

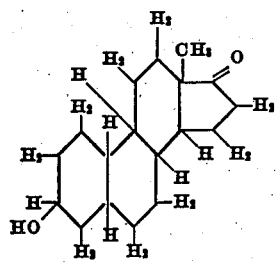

2. A method for the production of hydrogenation products of follicle hormones which comprises subjecting solutions of follicle hormones taken from the class consisting of $C_{18}H_{18}O_2$, $C_{18}H_{20}O_2$ and $C_{18}H_{22}O_2$, to the action of hydrogen under superatmospheric pressure in the presence of hydrogenation catalysts which are capable of causing hydrogenation of the benzene ring but incapable of causing removal of oxygen to form a compound of the following structural formula:

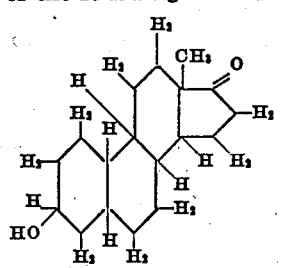

at a temperature above room temperature and below the decomposition temperature of the organic compounds present.

3. A method for the production of hydrogenation products of follicle hormones which comprises subjecting solutions of follicle hormones taken from the class consisting of $C_{18}H_{18}O_2$, $C_{18}H_{20}O_2$ and $C_{18}H_{22}O_2$, to the action of hydrogen under superatmospheric pressure in the presence of hydrogenation catalysts which are capable of causing hydrogenation of the benzene ring but incapable of causing removal of oxygen to form a compound of the following structural formula:

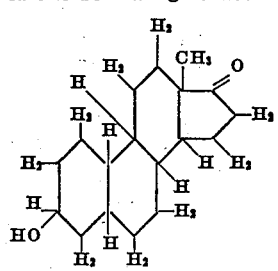

and continuing the hydrogenation until a compound of the following structural formula is formed:

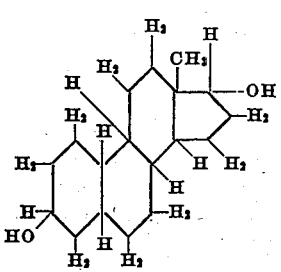

4. A method for the production of hydrogenation products of follicle hormones which comprises subjecting solutions of follicle hormones taken from the class consisting of $C_{18}H_{18}O_2$, $C_{18}H_{20}O_2$ and $C_{18}H_{22}O_2$, to the action of hydrogen under superatmospheric pressure in the presence of hydrogenation catalysts which are capable of causing hydrogenation of the benzene ring but incapable of causing removal of oxygen to form a compound of the following structural formula:

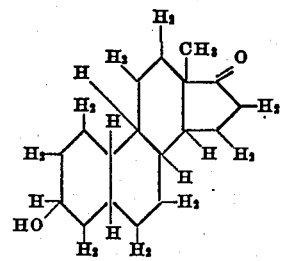

at a temperature above room temperature and below the decomposition temperature of the organic compounds present and continuing the hydrogenation until a compound of the following structural formula is formed:

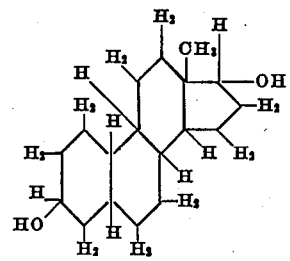

5. A method for the production of hydrogenation products of follicle hormones which comprises subjecting solutions of follicle hormones taken from the class consisting of the hormones of the general formulas: $C_{18}H_{18}O_2$, $C_{18}H_{20}O_2$ and $C_{18}H_{22}O_2$, at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until at least the benzene nucleus of the follicle hormone molecule is hydrogenated, thereby preventing the splitting-off of oxygen from the starting material.

6. A method for the production of hydrogenation products of follicle hormones which comprises subjecting solutions of follicle hormones taken from the class consisting of the hormones of the general formulas: $C_{18}H_{18}O_2$, $C_{18}H_{20}O_2$ and $C_{18}H_{22}O_2$, at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

7. A method for the production of hydrogenation products of follicle hormones which comprises subjecting alkaline solutions of follicle hormones taken from the class consisting of the hormones of the general formulas: $C_{18}H_{18}O_2$, $C_{18}H_{20}O_2$ and $C_{18}H_{22}O_2$, to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

8. A method for the production of hydrogenation products of follicle hormones which comprises subjecting solutions of follicle hormones taken from the class consisting of the hormones of the general formulas: $C_{18}H_{18}O_2$, $C_{18}H_{20}O_2$ and $C_{18}H_{22}O_2$, in organic solvents at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

9. A method for the production of hydrogenation products of the follicle hormone which comprises subjecting a solution of a crude crystalline follicle hormone at a temperature above room temperature and below the decomposition temperature of the organic compounds present to the action of hydrogen under superatmospheric pressure in the presence of hydrogenation catalysts which are capable of causing hydrogenation of the benzene ring but incapable of causing removal of oxygen.

10. A method for the production of hydrogenation products of the follicle hormone which comprises subjecting a solution of a crude crystalline follicle hormone at a temperature above room temperature and below the decomposition temperature of the organic compounds present to the action of hydrogen under superatmospheric pressure in the presence of hydrogenation catalysts which are capable of causing hydrogenation of the benzene ring but incapable of causing removal of oxygen, whereby the hydrogenation is continued until at least the benzene nucleus of the follicle hormone molecule is hydrogenated thereby preventing the splitting-off of oxygen from the starting material.

11. A method for the production of hydrogenation products of the follicle hormone which comprises subjecting a solution of a crude crystalline follicle hormone at a temperature above room temperature and below the decomposition temperature of the organic compounds present to the action of hydrogen under superatmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

12. A method for the production of hydrogenation products of the follicle hormone which comprises subjecting an alkaline solution of a crude crystalline follicle hormone at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until at least the benzene nucleus of the follicle hormone molecule is hydrogenated thereby preventing the splitting-off of oxygen from the starting material.

13. A method for the production of hydrogenation products of the follicle hormone which comprises subjecting an alkaline solution of a crude crystalline follicle hormone at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

14. A method for the production of hydrogenation products of the follicle hormone which comprises subjecting solutions of a crude crystalline follicle hormone in organic solvents at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until at least the benzene nucleus of the follicle hormone molecule is hydrogenated thereby preventing the splitting-off of oxygen from the starting material.

15. A method for the production of hydrogenation products of the follicle hormone which comprises subjecting solutions of a crude crystalline follicle hormone in organic solvents at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group.

16. A method for the production of hydrogenation products of the follicle hormone which comprises subjecting a solution of a crude crystalline follicle hormone at a temperature above room temperature and below the decomposition temperature of the organic compounds present to the action of hydrogen under super-atmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group, and isolating the hydrogenation product obtained.

17. A method for the production of hydrogenation products of the follicle hormone which comprises subjecting a solution of a crude crystalline follicle hormone at a temperature above room temperature and below the decomposition temperature of the organic compounds present to the action of hydrogen under superatmospheric pressure in the presence of hydrogenation catalysts which are capable of causing hydrogenation of the benzene ring but incapable of causing removal of oxygen, whereby the hydrogenation is continued until the benzene nucleus of the follicle hormone molecule is hydrogenated and the keto group is reduced to the secondary alcohol group, isolating and purifying the hydrogenation product obtained.

WALTER SCHOELLER.
FRIEDRICH HILDEBRANDT.
ERWIN SCHWENK.